United States Patent Office 2,719,784
Patented Oct. 4, 1955

2,719,784

LOW VOLATILE COMPOSITIONS FOR CONTROLLING VEGETATION GROWTH

Gustave K. Kohn, Berkeley, Calif., assignor to California Spray-Chemical Corporation, Richmond, Calif., a corporation of Delaware No Drawing. Application April 14, 1951,
Serial No. 221,122

7 Claims. (Cl. 71—2.5)

This invention relates to an improved composition for use in the control of vegetation growth, and particularly to a low volatile herbicidal composition adapted for selective control and destruction of undesirable plant material.

While 2,4,5-trichlorophenoxyacetic acid has been extensively used in the form of its salts, esters, amides, etc., in the formulation of phytocidal compositions, a number of difficulties have been encountered in the application of these compositions which have rendered this material impractical and even injurious in certain usage. Phytocidal compositions employing the foregoing derivatives of 2,4,5-trichlorophenoxyacetic acid as the active ingredient are adapted for selective control of broad-leaf plants and notably the woody stem variety in narrow-leaf plant environment, and particularly for the destruction of mesquite and other woody-stemmed, broad-leaf plants associated with range crops.

These compositions are normally applied either by spraying or dusting under varying conditions depending upon the area to be treated. One of the principal difficulties associated with the application of these compositions is the fact that the convenional ester derivatives of 2,4,5-trichlorophenoxyacetic acid possess a high vapor pressure and, under varying conditions of field usage, appreciable quantities of the composition may be carried either by draft or diffusion into proximal areas containing valuable plant crops susceptible to the phytocidal ingredient. In such instances, which are normally associated with improper application or unexpected changes in climatic conditions, the advantages to be gained in the destruction of weeds and undesirable plant material in one area may be considerably overbalanced by the destruction of an adjacent or proximal susceptible cash crop.

It has now been found possible to overcome these difficulties in formulation and application of herbicidal compositions by employing as the active ingredient a particular ester of 2,4,5-trichlorophenoxyacetic acid which possesses an exceptionally low volatility. This particular ester, namely, the tetrahydrofurfuryl ester of 2,4,5-trichlorophenoxyacetic acid, not only possesses the advantage of low volatility, but also allows the production of concentrates of maximum acid concentration. This latter feature is an important practical advantage in field application of herbicidal compositions where formulation effectiveness is measured in terms of parent acid concentration per gallon of concentrate. Various attempts have been made to reduce the high volatility of the parent acid hormone by employing derivatives, and in particular, esters of high molecular weight such as the polyalkoxyalkyl esters. Although these high molecular weight esters may possess a sufficiently low volatility, such reduction in vapor pressure is accomplished at a material sacrifice of parent acid content and, accordingly, phytocidal activity. In contrast thereto, the tetrahydrofurfuryl ester of 2,4,5-trichlorophenoxyacetic acid allows the formation of low volatile herbicidal compositions as well as concentrates containing a maximum parent acid concentration.

The tetrahydrofurfuryl ester of 2,4,5-trichlorophenoxyacetic acid in its pure form exists as white needle crystals with a melting point of 48–49° C., a boiling point of 200–201° C. at 2 mm. Hg and a refractive index ($n$/D) of 1.5545 at 22° C. before crystallization. The ester is soluble in the majority of organic solvents and substantially insoluble in water. Technical preparations of the ester, and particularly solvent solutions, appear as a viscous, reddish-brown liquid which crystallizes considerably below the crystallization temperature of the pure ester. This ester may be prepared by condensation of 2,4,5-trichlorophenoxyacetic acid and tetrahydrofurfuryl alcohol in the presence of a dehydrating esterification agent such as phosphoric acid, p-toluene sulfonic acid, etc. The technical grade of tetrahydrofurfuryl alcohol is a particularly desirable reagent for the condensation in view of the fact that it contains up to about 15% of pentanediol. The ester product resulting from this esterification is a mixture of esters of tetrahydrofurfuryl alcohol and the associated pentanediols which do not adversely affect the vapor pressure of the product ester. For optimum yields of the ester it is generally preferable to employ a slight molar excess of the alcohol and conduct the condensation in the presence of a water-immiscible solvent. Additionally, it is desirable to employ a weakly acidic esterification agent in order to avoid any appreciable polymerization and resinification of the tetrahydrofurfuryl alcohol.

The ester hormone of the invention may be formulated in the form of a dust or liquid spray composition. Thus, the ester may be compounded with a porous, inert, finely divided solid carrier such as talc, soapstone, frianite, pyrophyllite, Attapulgas clay, chalk, volcanic ash, etc., and preferably in conjunction with a water-soluble and/or oil-soluble emulsifying or wetting agent. The dusting compositions may be formulated as a concentrate for field dilution with additional powdered carrier, or compounded in the form of a wettable powder which may be diluted to form a stable emulsion with water or partially refined mineral oil.

Although the dust formulations may be used for both general and selective control of vegetation growth, the desirable features of the subject ester hormone are more pronounced in the formulation and application of liquid spray compositions. Broadly, this ester may be applied as a dispersion in a convenient liquid carrier. The dispersion may range from a substantially molecular dispersion when employing organic solvents or liquids with a high solvent power to a physical dispersion or emulsion when water is used as the primary carrier. In either event, it is considered desirable to incorporate with the phytocidal ester a wetting, dispersing, or emulsifying agent in the formulation of the herbicidal concentrate. There surface-active agents may be any of the conventional ionic or non-ionic types of wetting, dispersing, or emulsifying agents, and for certain types of application mixtures of ionic and non-ionic surfactants are preferred. The choice of the emulsifying agent or mixture of agents as well as the amount employed is largely dependent upon its ability to provide a stable emulsion of the concentrate under the conditions and amount of dilution to be employed for the field application.

For optimum absorption of the 2,4,5-trichlorophenoxyacetic acid ester on the plant surfaces it has been determined that dilution in spray oils or conventional petroleum oils such as diesel oil is desirable, and the herbicide may be applied directly from such dilutions or subsequently emulsified in water. In order to facilitate the solution or emulsification in the petroleum oils, the ester concentrate is preferably compounded with a mutual solvent. These solvents include the aliphatic esters and ketones and the aromatic hydrocarbons and oxygen-containing derivatives such as isopropyl acetate, methyl isopropyl ketone, cyclohexanone, xylene, cresylic acids (mixed cresols and xylenols), methyl naphthalenes, etc.

Although previous reference and emphasis have been made with respect to the tetrahydrofurfuryl ester of 2,4,5-trichlorophenoxyacetic acid as the sole active component of the plant control composition, it may be desirable to compound a formulation which includes other acid hormones or even other derivatives of 2,4,5-trichlorophenoxyacetic acid in conjunction therewith. Thus, for certain types of application, it has been found advantageous to incorporate a derivative of 2,4-dichlorophenoxyacetic acid with the ester of the invention and obtain an herbicidal composition which is effective against broadleaf plants possessing both succulent and woody stems. Other combinations of active components such as insecticides and fertilizers are contemplated within the purview of the invention, providing the tetrahydrofurfuryl ester of 2,4,5-trichlorophenoxyacetic acid is present in the composition.

When applied in minute concentrations in simple dust or aqueous dispersions, the present ester may be used as a plant stimulant to encourage vegetative or root growth or germination of seed. However, of primary importance is the application of this ester in phytocidal concentrations of at least 0.04% by weight of parent acid. The optimum concentration of the applied herbicide or the required amount of dilution of the concentrate is dependent upon numerous factors, such as type of application, method of applying, composition of concentrate, etc. For general field application the concentration of parent acid used is normally between 0.04 and 0.10% by weight when sprayed from field rigs and between 1.5 and 4.0% by weight when sprayed from an airplane. These ranges of final concentrations are merely representative for the more conventional types of application, and higher concentrations may be required to eradicate less susceptible plant material.

In the formulation of concentrates up to about 3 lbs. of parent acid per gallon, solubility of the ester in conventional solvents is sufficient to maintain the concentrate in a stable solution, even at 0° F. However, at higher concentrations of parent acid per gallon in conventional solvents, the phytocidal ester has a tendency to crystallize out of solution at low temperatures.

The tetrahydrofurfuryl ester of 2,4,5-trichlorophenoxyacetic acid contains 75% parent acid, and in compounding a condensate solution containing 4 lbs. of acid, there is allowed a solvent capacity of 47 volume per cent. In preparing 4 lbs. per gallon concentrates using technical xylene, a heavy aromatic fraction, isopropyl acetate, and methyl isobutyl ketone as the individual solvents, it was found that the ester crystallized at the following temperatures:

|  | °C. |
| --- | --- |
| Technical xylene | 20–22 |
| Heavy aromatic fraction | 20 |
| Isopropyl acetate | 16 |
| Methyl isobutyl ketone | 16.5 |

Contrary to the foregoing experiences with the above solvents, it was found that by employing cresylic acid, i. e., a mixture of cresols and xylenols in the formulation of concentrates containing greater than 3 lbs. of parent acid per gallon, the resulting solution remained liquid even at temperatures as low as 0° F. and could not be crystallized at that temperature even with crystal seeding. This solubility effect was consistent even when employing mixtures of solvents containing at least 50% cresylic acid. By using cresylic acid as at least the major proportion of the solvent, concentrates containing up to about 5 lbs. of parent acid per gallon could be obtained which not only remained as a stable liquid at temperatures down to 0° F., but also possessed adequate petroleum oil solubility in subsequent dilutions.

The use of cresylic acid or cresols or xylenols as the solvent in the preparation of the concentrated formulations materially enhances the phytocidal activity of the composition by virtue of the fact that the cresylic acid is itself a powerful general herbicide; however, emulsification difficulties were encountered in its use. These emulsification difficulties have been resolved by the preferred use of amine salts of low molecular weight fatty acids, and particularly the amine salts prepared by neutralization of fatty acids containing from 1–3 carbon atoms with oil-soluble, high molecular weight, aliphatic amines. Other types of conventional emulsifiers may be used, but the disadvantage in their use is the fact that considerably higher concentrations of emulsifier are required, and even at such high concentrations the ester formulation is difficult to emulsify in both water and oil dilutions. Thus, in the preparation of ester concentrates containing from 3–5 lbs. of parent acid per gallon, it is preferred to formulate the subject ester with a xylenol and/or cresol solvent and employ as the emulsifier an oil-soluble amine salt of a water-soluble fatty acid, such as acetic acid.

The following examples illustrate a few representative formulations of the tetrahydrofurfuryl ester of 2,4,5-trichlorophenoxyacetic acid which are useful as herbicidal compositions. It is to be understood that the subject invention is not to be construed as limited to the specific examples.

*Example I*

A phytocidal concentrate containing 2 lbs. of parent acid per gallon was formulated as follows:

|  | Pounds | Gallons |
| --- | --- | --- |
| Tetrahydrofurfuryl ester of 2,4,5-trichlorophenoxyacetic acid (93%) | 2.86 | 0.253 |
| Sodium alkyl aryl sulfonate (30% solution in xylene) | 0.456 | 0.06 |
| Igepal CA 300* | 0.354 | 0.04 |
| Technical xylene | 4.64 | 0.647 |
|  | 8.310 | 1.000 |

*Alkyl aryl polyethylene glycol ether.

*Example II*

The concentrate of Example I dissolves completely in diesel oil and may be used in dilution of one part of concentrate with 400 parts of water as an effective control of mesquite, sage brush, willows, poison oak, wild raspberry, in pasture land, and in proximal areas to narrow-leaf plant crops.

*Example III*

The following formulation illustrates the preparation of a concentrate containing 2 lbs. of 2,4,5-trichlorophenoxyacetic acid and 2 lbs. of 2,4-dichlorophenoxyacetic acid per gallon.

|  | Pounds | Gallons |
| --- | --- | --- |
| Tetrahydrofurfuryl ester of 2,4,5-trichlorophenoxyacetic acid (90.7%) | 3.051 | 0.285 |
| Tetrahydrofurfuryl ester of 2,4-dichlorophenoxyacetic acid (93%) | 2.869 | 0.253 |
| Igepal CA 300 | 0.354 | 0.04 |
| Alkyl benzyl trimethyl ammonium chloride (30% solution in xylene) | 0.165 | 0.022 |
| Technical xylene | 2.856 | 0.4 |
|  | 9.295 | 1.000 |

*Example IV*

The concentrate of Example III was diluted in the preparation of an airplane spray concentrate in the following proportions: 3 parts of concentrate, 8 parts of diesel oil, 24 parts of water. This airplane concentrate may be used per se or in further water dilution. The mixed ester concentrate is particularly adapted for field application where broad-leaf woody stem plants, such as poison oak, wild raspberry, brambles, etc. are prevalent.

The combination of the two phytocidal components has been found to possess a greater phytocidal activity than would be normally expected from like concentrations of the individual components.

Variations in the formulation of the concentrates of Examples I and III have been made without affecting to any great degree the efficiency of the concentrate; thus, in place of the combination of ionic and non-ionic emulsifiers set forth in the exemplary concentrates, individual ionic emulsifiers have been used with satisfactory results. These emulsifiers are Armeen TD acetate and the sodium and triethanolamine salts of alkyl aryl sulfonic acids. The sodium and triethanolamine alkyl aryl sulfonates have also been used with the non-ionic emulsifier Igepal CA 100. Additionally, in the formulations of Examples I and III, Triton X 100 and 155 have been substituted for the Igepal emulsifier.

*Example V*

The following formulation illustrates the compounding of an ester concentrate containing 4 lbs. of parent acid per gallon.

|  | Pounds | Gallons |
|---|---|---|
| Tetrahydrofurfuryl ester of 2,4,5-trichlorophenoxyacetic acid (93%) | 5.72 | 0.505 |
| Cresylic acid, FF grade | 2.55 | 0.297 |
| Armeen TD* | 0.666 | (0.088) |
| Glacial acetic acid | 0.399 | 0.045 |
| Methyl isobutyl ketone | 0.423 | 0.063 |
|  | 9.758 | 1.000 |

*Oil-soluble fatty amines prepared from tallow.

In place of the Armeen TD, other high molecular weight amines, such as octadecanylamine or oil-soluble amines derived from petroleum fractions, may be employed. This concentrate was diluted for application in accordance with the directions of Example IV.

*Example VI*

As an illustration of the non-volatility of herbicidal compositions containing the tetrahydrofurfuryl esters of 2,4,5-trichlorophenoxyacetic acid, the following test was conducted. Young tomato plants about 2 to 3 inches high were selected as the susceptible plant material. The comparison was conducted on a concentrate containing the tetrahydrofurfuryl esters of 2,4,5-trichlorophenoxyacetic acid and 2,4-dichlorophenoxyacetic acid similar in composition to the concentrate of Example III. This concentrate contained the equivalent of 2 lbs. of each parent acid per gallon. In comparison, a concentrate in a xylene solvent of the isopropyl ester of 2,4,5-trichlorophenoxyacetic acid with a concentration equivalent to 4 lbs. of parent acid per gallon was used. In the test, a plant and an open-cap vial containing a few ml. of the herbicidal concentrate were placed under an inverted 9 liter bell jar. The plants were well watered at the start of the experiment and every day thereafter by quickly lifting up the jar and adding water. The temperature in the greenhouse during the experimental period varied between a maximum of 88° F. and a minimum of 50° F., with an average of around 74° F. The tomato plant tested with the isopropyl ester of 2,4,5-trichlorophenoxyacetic acid began to droop within five hours after the start of the experiment, and the test plant used in conjunction with the ester concentrate of the invention maintained a healthy growth even after six days of observation.

Obviously, many modifications and variations of the invention as hereinbefore set forth may be made without departing from the spirit and scope thereof, and only such limitations should be imposed as are indicated in the appended claims.

I claim:

1. An herbicidal composition containing as an active component the tetrahydrofurfuryl ester of 2,4,5-trichlorophenoxyacetic acid, said active component being present in phytocidal concentration of from 0.04–4.0% by weight.

2. An herbicidal composition containing a phytocidal concentration of the tetrahydrofurfuryl ester of 2,4,5-trichlorophenoxyacetic acid compounded with a methyl-substituted phenol solvent and an emulsifying agent comprising an oil-soluble amine salt of a water-soluble fatty acid containing 1 to 3 carbon atoms.

3. A phytocidal concentrate adapted for dilution in oil or water comprising the tetrahydrofurfuryl ester of 2,4,5-trichlorophenoxyacetic acid present in amounts equivalent to from about 3 to 5 lbs. of parent acid per gallon of concentrate compounded with a methyl-substituted phenol solvent and an emulsifying agent comprising an oil-soluble amine salt of a water-soluble fatty acid containing 1 to 3 carbon atoms.

4. A phytocidal concentrate adapted for dilution in oil or water which comprises the tetrahydrofurfuryl ester of 2,4,5-trichlorophenoxyacetic acid present in amounts equivalent to from about 1 to 3 lbs. of parent acid per gallon of concentrate compounded with an oil-miscible solvent and an emulsifying agent.

5. A method of selectively killing undesirable broad-leaf plant growth which comprises applying to said undesirable plant growth a liquid spray composition containing the tetrahydrofurfuryl ester of 2,4,5-trichlorophenoxyacetic acid present in phytocidal concentration and combined with an emulsifying agent and a liquid carrier.

6. A herbicidal composition comprising an inert carrier and the tetrahydrofurfuryl ester of 2,4,5-trichlorophenoxyacetic acid, said ester being present in the composition in phytocidal concentration.

7. A method of selectively killing broad leaf plant growth without substantial damage to proximal desirable broad leaf plant growth which comprises applying to said undesirable plant growth a phytocidal concentration of the tetrahydrofurfuryl ester of 2,4,5-trichlorophenoxyacetic acid.

References Cited in the file of this patent

UNITED STATES PATENTS

| 2,390,941 | Jones | Dec. 11, 1945 |
| 2,543,397 | Allen | Feb. 27, 1951 |

OTHER REFERENCES

"Science," Sept. 10, 1948, pages 278 and 279.